United States Patent [19]

Lew et al.

[11] Patent Number: 5,246,636
[45] Date of Patent: Sep. 21, 1993

[54] PROCESS FOR MAKING MICROCAPSULES AND APPARATUS THEREFOR

[75] Inventors: Chel W. Lew; Jack D. Trevino, both of San Antonio, Tex.

[73] Assignee: Southwest Research Institute, San Antonio, Tex.

[21] Appl. No.: 697,214

[22] Filed: May 7, 1991

[51] Int. Cl.$^5$ .................... B01J 13/04; B28B 1/32
[52] U.S. Cl. .................... 264/4.1; 427/213.3; 427/212; 264/4; 425/5
[58] Field of Search .................... 425/5, 10; 264/7, 14, 264/4, 4.1; 427/420, 212, 213.3; 118/DIG. 2, DIG. 4

[56] References Cited

U.S. PATENT DOCUMENTS

| | | | |
|---|---|---|---|
| 2,576,952 | 12/1951 | Lowe et al. | 118/24 |
| 2,594,469 | 4/1952 | Mahoney | 427/212 |
| 2,685,537 | 8/1954 | Dunmire | 118/20 |
| 3,015,128 | 1/1962 | Somerville | 425/5 |
| 3,241,520 | 3/1966 | Wurster et al. | 118/62 |
| 3,394,430 | 7/1968 | Stephanoff et al. | 425/5 |
| 3,400,011 | 9/1968 | Fox | 427/420 X |
| 3,423,489 | 1/1969 | Arens et al. | 264/4 |
| 3,477,842 | 11/1969 | Cook et al. | 427/212 X |
| 4,217,851 | 8/1980 | Biehl et al. | 118/20 |
| 4,377,375 | 3/1983 | Slaughter | 425/8 |

FOREIGN PATENT DOCUMENTS

| | | | |
|---|---|---|---|
| 1144468 | 2/1963 | Fed. Rep. of Germany | 264/14 |
| 2628014 | 9/1989 | France | 427/212 |
| 3236608 | 10/1988 | Japan | 425/10 |
| 1164430 | 6/1989 | Japan | 264/14 |

Primary Examiner—Robert L. Stoll
Assistant Examiner—John M. Covert

[57] ABSTRACT

A process for forming microcapsules wherein the core material in the form of substantially uniform particles is projected through at least one descending curtain of encapsulating wallforming material in the form of an atomized mist of droplets so as to coat said particles with said droplets to form a substantially uniform thickness of encapsulating material and apparatus for carrying out such process.

10 Claims, 3 Drawing Sheets

PROCESS FOR MAKING MICROCAPSULES AND APPARATUS THEREFOR

BACKGROUND OF THE INVENTION

The present invention relates to a process and apparatus for forming single or multi-wall microcapsules.

There are a variety of processes for the formation of microcapsules as well as a variety of apparatus to make microcapsules. In the main, all are directed to the effort of rapidly forming microcapsules of substantially uniform particle sizes and with substantially uniform outer shells. While all such prior processes and apparatus are generally suitable to a certain degree, they none theless individually suffer from one or more defects such as being procedures which are costly to utilize, and/or ones in which it is difficult to control the uniformity of the size of the microcapsule formed, and/or cannot make the microcapsules in a rapid manner. This is due to the fact that it is difficult to obtain substantially uniformly sized microcapsules having a substantially complete coating and uniform coating thickness of the encapsulating material, whether there be a single outer shell or multiple outer shells to ensure the uniformity of the resultant microcapsules.

Such prior techniques include those as set forth in U.S. Pat. No. 3,423,489 wherein the fill material and the encapsulated material are extruded together through a device in which the fill material is extruded in the center of the device while at the same time therearound there is extruded the encapsulating material so that one has a tube of the coating material surrounding the inner core of the encapsulating material. This patent goes on to state the very precise controls that are required in order to be able to have the uniform particles and the reliance upon "natural forces" in order to form the individual droplets. Another procedure is that described in U.S. Pat. No. 3,015,128 in which a centrifugal nozzle is utilized causing the filling material to pass through a continuous flow of encapsulating material and on to a rotating distributing plate. The deficiencies of this process are discussed in columns 1 and 2 of the U.S. Pat. No. 3,423,489. Other devices, such as those disclosed in U.S. Pat. No. 3,241,520 and 4,217,851, rely on fluidization of the filler material at the same time applying a coating thereon. The length of time individual particles are in the fluidized condition and exposed to the coating material will vary widely so these processes suffer from the defect of not being able to get the uniformity of particle microcapsules desired.

Lastly, there are the processes, such as that set forth in U.S. Pat. No. 2,685,537, wherein again a spray of a coating material is utilized and in this case the requirement to have ionization rings in order to enable the tablets to be coated to be a different charge from the coating which is sprayed thereon.

None of these procedures, as noted, is entirely suitable to give the uniformity of outer shell size and uniformity of microcapsules. Also, none of these processes has the ability to form single or multi-wall microcapsules in the same system and a system which can form microcapsules that can vary in sizes from less than 100 microns to several thousand microns or larger.

SUMMARY OF THE INVENTION

The present invention overcomes the prior art problems and provides a process and apparatus system for the production of single or multi-wall microcapsules of various uniform sizing in a rapid manner.

Briefly stated, the present invention comprises the process of forming microcapsules comprising an inner core and at least one encapsulating wall comprising forming and projecting substantially uniform particles of core material of the size desired through at least one descending curtain of encapsulating wall material in the form of an atomized mist, the speed of projection of said droplets and pressure used to form said atomized mist being maintained substantially constant for each given size of microcapsules desired, and collecting the microcapsule after passage through said at least one curtain.

The invention also comprises the apparatus system for carrying out this process as is described in detail below.

DETAILED DESCRIPTION

Figure 1:
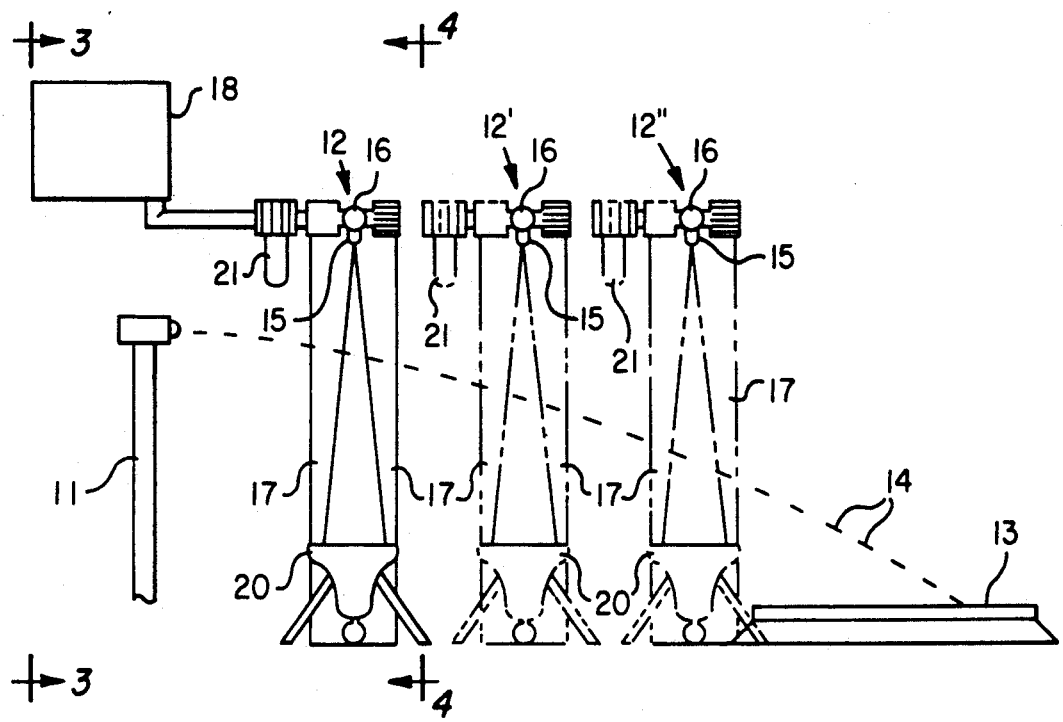
FIG. 1 is a partial side elevational view of the apparatus system of the present invention.
Figure 2:
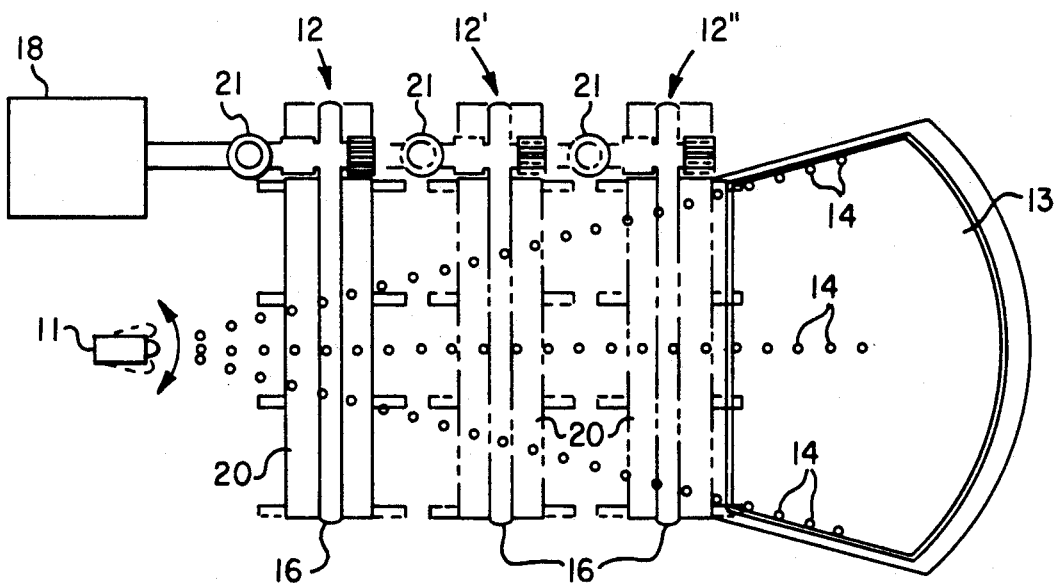
FIG. 2 is a top plan view of the apparatus system of FIG. 1.

It should first be noted that the instant invention is directed to the manufacture of microcapsules broadly; that is, those utilizing any inner core material as well as any encapsulating wall material as is discussed in greater detail below. Also, the present invention permits the formation of either single wall or multi-wall microcapsules and in the case of multi-wall microcapsules, those in which each of the individual walls can either be of the same or different materials and the possibility of one or more of the wall themselves containing active materials. This permits preparation of microcapsules with controlled release characteristics which are desired in some products to give either different release rates or release under certain conditions such as acidity and/or alkalinity.

Referring to the drawings, FIGS. 1 to 4 depict an apparatus system 10 according to the present invention comprising a core or filler forming device 11 operatively associated with fog curtain former 12 and the microcapsule collector 13. The drawings also show in broken outline form the ability to have addition fog curtain formers 12' and 12" if one desires to make multi-wall microcapsules. This will be described in detail below, but it is sufficient to note that the additional fog curtains 12' and 12" are the same in terms of structure as fog curtain former 12.

The fill or core forming device 11 depicted in the drawing is a conventional oscillating head device which can project either solid or liquid particles of a uniform size. The path of the liquid or solid core material of uniform size is depicted by the broken line 14. It will be understood that in place of the conventional oscillating head 11, any device that is suitable for forming uniform size fill material either by atomization or spraying can be used. Examples are spray nozzles, rotating discs, centrifugal extrusion devices, and other like devices.

What is important is that core forming device 11 be capable of forming uniform droplets of solid or liquid core material and have the ability to project the droplet through the fog curtain as described below.

Fog curtain former 12 comprises fog forming nozzles 15 spaced along conduit 16 so as to ensure that there is a uniform fog curtain 17 of encapsulating material that will descend as a mist of fine particles. To ensure a substantially uniform thickness the nozzles 15 spray a fan-shaped spray, not a cone-shaped spray. Conduit 16 is fed by reservoir 18 containing the encapsulating material.

Figure 3:
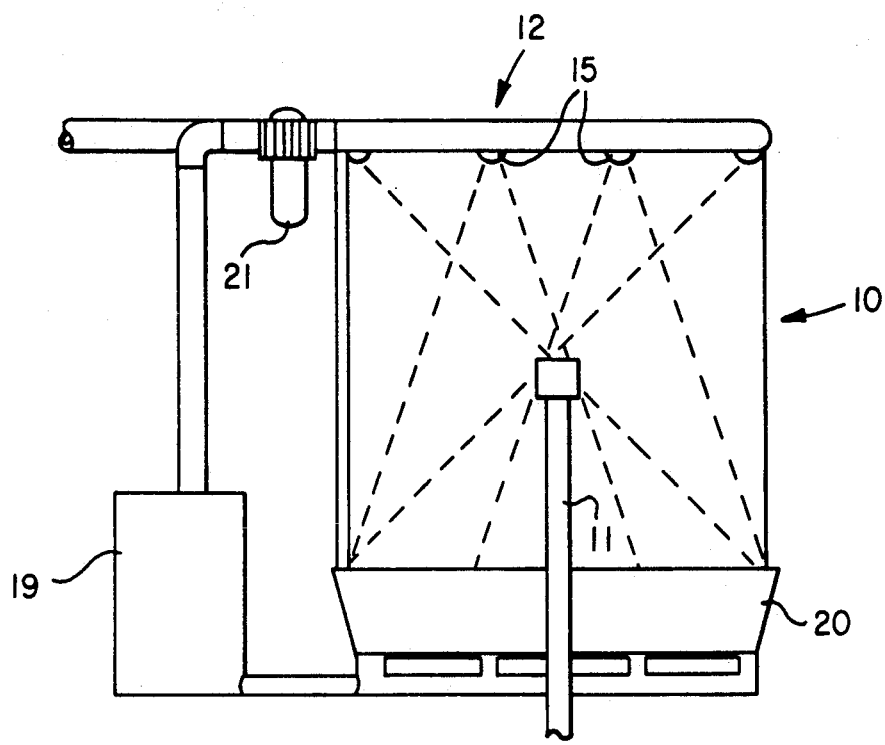
FIG. 3 is a front elevational view taken along lines 3—3 of FIG. 1.
Figure 4:
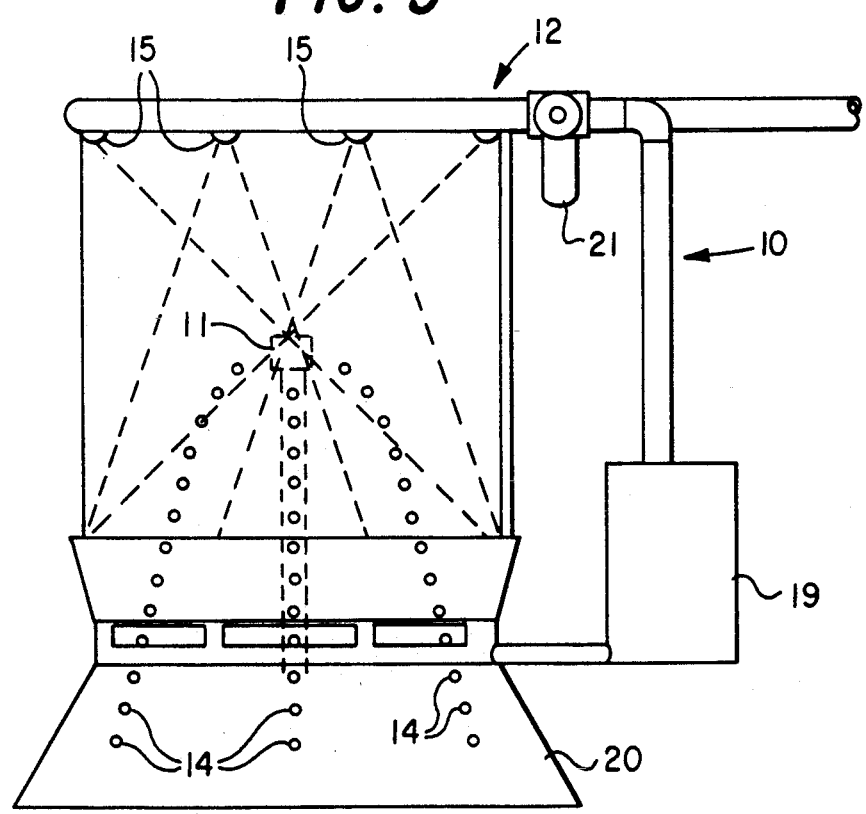
FIG. 4 is a rear elevational view taken along lines 4—4 of FIG. 1.

As best shown in FIGS. 3 and 4, a recirculating pump 19 collects the fog curtain material from trough 20 and pumps it back into conduit 16 for reutilization in forming fog curtain 17. To ensure the uniformity of the mist, pressure monitoring device 21, such as a standard pressure gauge, is utilized to ensure that the proper pressure is maintained. Not shown are conventional pump means which are utilized to maintain the desired pressure on the encapsulating materials through the nozzle to give the desired fog.

As has been discussed above, if only one outer wall is desire then only one fog curtain former 12 is utilized. In the case of multi-wall microcapsules, then one or more additional fog curtain formers such 12' and 12" can be utilized and they can contain the same encapsulating wall material or a different encapsulating material. Moreover, the encapsulating material can include other active ingredients if desired. Thus, the instant apparatus system provides a higher degree of flexibility.

Moreover, by controlling the size of the mist particles and having them descend by gravity in the form of a fog curtain, there is a minimal ability to alter the shape of the capsules. This ensures a uniform coating thereon so as to maintain the desired uniform final size of the resulting microcapsules. Once the microcapsules pass through the single or multiple fog curtains 17, 17', or 17" they will solidify or dry as they pass through the air and land in the conventional collector 13 from which they can be removed.

Another manner of controlling the coating thickness is to regulate the temperature of the core material; i.e., the colder core material will have a thicker coating collected thereon than a warmer core material. For example, a chilled or cold core material exposed to the molten shell system will result in a thicker shell (as opposed to room temperature or warmer core material) because such cold core material causes more of such molten shell material to solidify on the core material as the core material passes through the curtain(s). Alternatively, the core material may be heated to an elevated temperature and the shell system chilled, which also results in a thicker shell layer about the core. Routine experimentation will determine the optimum conditions for any given core material/shell system to give the desired coating thickness.

It will also be evident that if it is desired to have curtain 17 of different thickness that the width of the fog curtains former 12 and number of spray nozzles 15 can be increased so as to have a wider fog curtain through which the particle must pass for any given coat. This will place a thicker layer of such encapsulating wall material as opposed to the other walls that may be utilized in making multi-walled capsules.

Figure 5:
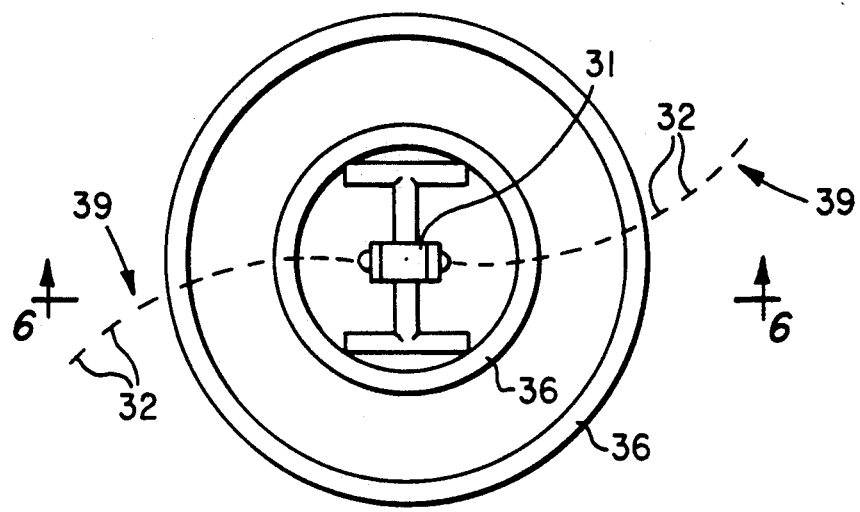
FIG. 5 is a top view of an alternate embodiment of the apparatus system of the present invention.
Figure 6:
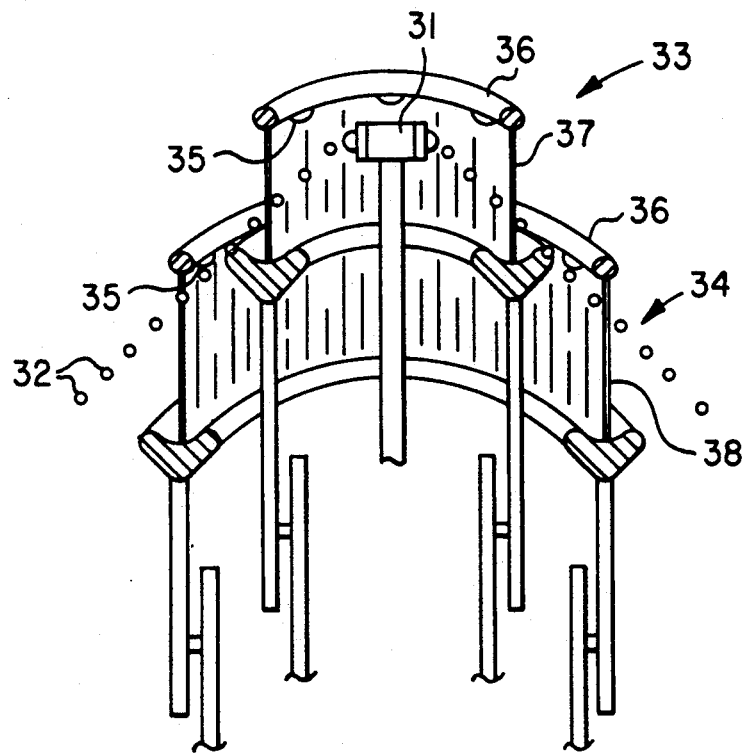
FIG. 6 is a perspective view in partial cross-section taken along line 6—6 of FIG. 5.

An alternate embodiment of the instant invention is depicted in FIGS. 5 and 6 and comprises utilization of a rotating core former 31 which will constantly rotate to pass uniformly sized droplets 32 through two circular curtains 37 and 38 of encapsulating material. The path of the droplets is depicted by broken lines 39. In this instance the curtains are concentric in shape and spaced about rotating device 31. The height of curtains 37 and 38 can be adjusted dependent upon the speed and angle at which the encapsulated device will spray the inner core capsules to ensure that the capsules will pass through each curtain and not impinge upon any of conduits 36 or nozzles 35 that form fog curtain formers 33 and 34. In this device again, the conduits are fed by reservoirs (not shown) and again conventional pressure gauges (not shown) and conventional pumps (not shown) are utilized as in the apparatus system depicted in FIGS. 1 to 4 to ensure that the pressure remains at the constant desired. Also not shown is the microcapsule collector means, usually a conventional circular trough surrounding the device for recovery of the microcapsules after they are formed.

The structural elements of the above-described apparatus system can be made of any metal or plastic commonly used in microencapsulating devices.

As to the core material, it can be any material it is desired to or which has been encapsulate. Examples are inks and dyes used in making carbonless copy paper, perfumes, biocides, flavorants, adhesives, foods, lubricants, and the like. The core material can be a liquid or a solid.

As to the encapsulating material, it can be any natural or synthetic polymer conventionally used for form microcapsule walls. Examples are the polyvinyl alcohols, gelatins, gum arabic, urea-formaldehyde resins, polyamides, polyimides, natural gums, natural or modified starches, and the like. The most suitable shell material for any particular core material is well-known by those skilled in this art.

The conventional solvents, if needed, can be utilized to place the shell material in a form to be sprayed if it is not desired to heat any such material which is solid to place it in a liquid form.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appending claims.

What is claimed is:

1. A process of forming microcapsules consisting of an inner core and at least one encapsulating wall comprising forming and projecting substantially uniform particles of the core material of the size desired through at least one descending curtain of encapsulating wall-forming material in the form of an atomized mist of droplets, the speed of projecting of said droplets and said pressure used to form said atomized mist being maintained substantially constant for each given size of microcapsules desired and collecting the microcapsules formed after passage through said at least one encapsulating wall.

2. The process of claim 1 wherein said particles are solids or liquid droplets and said encapsulating material is a natural or synthetic polymer.

3. The process of claim 2 wherein said particles pass through at least two descending curtains of encapsulating material.

4. The process of claim 3 wherein the encapsulating material in each of said two descending curtains is the same.

5. The process of claim 4 wherein a different encapsulating material is used in each one of said two descending curtains.

6. Apparatus for forming microcapsules comprising means for forming at least one curtain of encapsulating material in the form of a descending atomized mist of droplets, means operatively associated with said at least one curtain means for forming and projecting particles of core material through said at least one curtain material, and means for recovering the resultant microcapsules.

7. The apparatus of claim 6 wherein said curtain forming means comprise at least one spray means adapted to form a fan-shaped spray operatively associated with a pump means for pumping the core material through said spray means to form a substantially uniform atomized mist.

8. The apparatus of claim 7 wherein there are means for forming at least two separate spaced-apart curtains of atomized mist, both of said curtains being positioned such that the core particles are passed through one and then the other of said curtains.

9. The apparatus of claim 8 wherein said at least two curtain-forming means are spaced concentrically about said means for forming and projecting particles of core material.

10. The apparatus of claim 9 wherein said means for forming and projecting core particles is a rotating means.

* * * * *